(12) United States Patent
Ogiwara et al.

(10) Patent No.: US 10,794,542 B2
(45) Date of Patent: Oct. 6, 2020

(54) HIGH PRESSURE TANK STRUCTURE

(71) Applicant: HONDA MOTOR CO., LTD., Minato-Ku, Tokyo (JP)

(72) Inventors: Naoki Ogiwara, Wako (JP); Kazuo Miyagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 16/255,225

(22) Filed: Jan. 23, 2019

(65) Prior Publication Data

US 2019/0226641 A1 Jul. 25, 2019

(30) Foreign Application Priority Data

Jan. 25, 2018 (JP) .................. 2018-010491

(51) Int. Cl.
*F17C 13/04* (2006.01)
*F17C 13/06* (2006.01)
(Continued)

(52) U.S. Cl.
CPC ............ *F17C 13/04* (2013.01); *F17C 1/02* (2013.01); *F17C 1/06* (2013.01); *F17C 13/06* (2013.01);
(Continued)

(58) Field of Classification Search
CPC .. F17C 13/04; F17C 1/06; F17C 13/12; F17C 1/02; F17C 13/084; F17C 13/06; F17C 2260/042; F17C 2205/0397; F17C 2223/0123; F17C 2203/0621; F17C 2201/056; F17C 2205/0153; F17C 2223/036; F17C 2205/0305; F17C 2270/0168; F17C 2205/0103;
(Continued)

(56) References Cited

U.S. PATENT DOCUMENTS 3,078,004 A * 2/1963 Randolph ................ B61D 5/04
220/562
3,692,206 A * 9/1972 Hornbeck ............. F17C 13/084
220/560.1
(Continued)

FOREIGN PATENT DOCUMENTS

| JP | 2007112180 A | 5/2007 |
|----|--------------|--------|
| JP | 2014074470 A | 4/2014 |
| JP | 2015175416 A | 10/2015 |

OTHER PUBLICATIONS

Office Action dated Jul. 16, 2019 issued over the corresponding Japanese Patent Application No. 2018-010491 and the English translation thereof.

*Primary Examiner* — Kareen K Thomas
(74) *Attorney, Agent, or Firm* — Carrier Blackman & Associates, P.C.; William D. Blackman; Joesph P. Carrier

(57) ABSTRACT

A high pressure tank structure includes a high pressure tank, a pressure relief device, and a heat-resistant plate. The high pressure tank is capable of storing a fluid on an inside of a resin-made liner covered with a reinforced layer. The pressure relief device, when heated to a certain activating temperature, reduces an internal pressure of the high pressure tank. The heat-resistant plate is integrally attached to the high pressure tank, so as to be disposed facing the reinforced layer which is positioned at least on a bottom surface side when mounted in a mounting body.

7 Claims, 5 Drawing Sheets

(51) Int. Cl.
*F17C 13/08* (2006.01)
*F17C 1/02* (2006.01)
*F17C 13/12* (2006.01)
*F17C 1/06* (2006.01)

(52) U.S. Cl.
CPC ............ *F17C 13/084* (2013.01); *F17C 13/12* (2013.01); *F17C 2201/0109* (2013.01); *F17C 2201/056* (2013.01); *F17C 2203/012* (2013.01); *F17C 2203/0604* (2013.01); *F17C 2203/066* (2013.01); *F17C 2203/0619* (2013.01); *F17C 2203/0621* (2013.01); *F17C 2205/0103* (2013.01); *F17C 2205/0153* (2013.01); *F17C 2205/0305* (2013.01); *F17C 2205/0308* (2013.01); *F17C 2205/0332* (2013.01); *F17C 2205/0397* (2013.01); *F17C 2221/012* (2013.01); *F17C 2223/0123* (2013.01); *F17C 2223/036* (2013.01); *F17C 2260/042* (2013.01); *F17C 2270/0168* (2013.01); *F17C 2270/0184* (2013.01)

(58) Field of Classification Search
CPC .......... F17C 2221/012; F17C 2203/066; F17C 2203/0619; F17C 2203/0604; F17C 2203/012; F17C 2205/0308; F17C 2205/0332; F17C 2201/0109; F17C 2270/0184; F17C 13/00; B65D 88/00–78
USPC ...... 220/586, 581, 588, 590, 592, 4.12, 562, 220/560.04–560.15; 137/72, 79, 377
See application file for complete search history.

(56) References Cited

U.S. PATENT DOCUMENTS

| | | | | |
|---|---|---|---|---|
| 4,241,843 A * | 12/1980 | Walker | ................. | B65D 90/046 220/4.12 |
| 4,832,398 A * | 5/1989 | Tecca | ..................... | B63C 11/22 294/151 |
| 4,950,458 A * | 8/1990 | Cunningham | ............ | B01J 7/00 422/164 |
| 5,443,286 A * | 8/1995 | Cunningham | ...... | B60R 21/2644 280/741 |
| 5,848,604 A | 12/1998 | Eihusen | | |
| 5,931,496 A * | 8/1999 | Brede | ................. | B60R 21/2644 280/741 |
| 6,382,232 B1 * | 5/2002 | Portmann | ............... | F16K 13/06 102/275.1 |
| 6,418,962 B1 * | 7/2002 | Wozniak | ................ | B60K 15/07 137/266 |
| 7,703,395 B2 * | 4/2010 | Cook | .................. | B60R 21/2644 102/530 |
| 7,721,750 B2 * | 5/2010 | Lindner | .................. | F24V 30/00 137/72 |
| 8,376,400 B2 * | 2/2013 | Mason | ................ | B60R 21/2644 280/736 |
| 8,733,382 B2 * | 5/2014 | Suess | .................... | F16K 17/383 137/468 |
| 2005/0252548 A1 * | 11/2005 | Stetson | ................. | C01B 3/0047 137/72 |
| 2015/0204483 A1 | 7/2015 | Kojima et al. | | |
| 2015/0260347 A1 | 9/2015 | Noguchi | | |

* cited by examiner

HIGH PRESSURE TANK STRUCTURE

CROSS-REFERENCE TO RELATED APPLICATION

This application is based upon and claims the benefit of priority from Japanese Patent Application No. 2018-010491 filed on Jan. 25, 2018, the contents of which are incorporated herein by reference.

BACKGROUND OF THE INVENTION

Field of the Invention

The present invention relates to a high pressure tank structure that includes a high pressure tank capable of storing a fluid on an inside of a resin-made liner.

Description of the Related Art

There is known a high pressure tank that includes: a resin-made liner capable of storing a fluid on its inside; and a reinforced layer configured from a fiber-reinforced plastic or the like covering an outer surface of the liner. An opening of the liner is provided with a cap in which a supplying/discharging hole is formed, and an inserting member is inserted in the supplying/discharging hole. The inserting member has formed therein a flow path for supplying/discharging the fluid to/from the liner, and has incorporated therein an electromagnetic valve for opening/closing the flow path, or the like.

This kind of high pressure tank sometimes includes a thermally activated pressure relief device (TPRD) like that described in the specification of U.S. Pat. No. 5,848,604, for example, in order that an internal pressure of the high pressure tank never exceeds a preset set value even when the high pressure tank has been placed under a high temperature environment, or the like. This pressure relief device is configured so that when its temperature rises to a certain activating temperature, it reduces the internal pressure of the high pressure tank by communicating the inside and an outside of the liner. Note that the activating temperature of the pressure relief device is preset so that the pressure relief device is never mistakenly activated by a temperature rise during normal operation of the high pressure tank such as during filling of the fluid, and is promptly activated by a temperature rise during an abnormality such as a fire.

When the high pressure tank including the above-described pressure relief device is employed while mounted in a mounting body, such as an automobile, for example, the fire resistance or the like of the high pressure tank is confirmed by performing a flame exposure test, based on a world uniform standard (GTR: Global Technical Regulation). Since this flame exposure test is configured on the basis of past vehicle fires, and so on, then a high pressure tank satisfying the standard of the flame exposure test will have a flame resistance required for it to be employed mounted in the mounting body.

Specifically, in the flame exposure test, when the high pressure tank has been mounted in the mounting body, a portion most separated from the pressure relief device, of an outer surface (the reinforced layer) of the high pressure tank that will be a bottom surface side, is exposed to a flame, after which the whole of the outer surface of the high pressure tank is exposed to a flame. In order to satisfy the standard of this flame exposure test, it is required that before the internal pressure of the high pressure tank that is rising by being exposed to a flame as described above reaches the set value, the pressure relief device reach the activating temperature and thereby operate in order to lower the internal pressure. Moreover, it is required that in a period until the pressure relief device is activated, thermal degradation of the reinforced layer be avoided so as to enable strength of the high pressure tank to be sufficiently maintained.

In the flame exposure test, the above-described standard is required to be satisfied in at least either one of a state where the high pressure tank has been mounted in the mounting body or a state of the high pressure tank standing alone. If, at this time, it is arranged to satisfy the above-described standard in a state where the high pressure tank has been mounted in the mounting body by, for example, providing the mounting body with a configuration for suppressing local heat input to the high pressure tank or the like, then if a specification of the mounting body is changed or a model of the mounting body is different, there ends up arising a need for the flame exposure test to be performed for every change of specification or model, even when a common high pressure tank is mounted, which is troublesome. Moreover, since a test body simulating the state of the high pressure tank having been mounted in the mounting body is configured from a more complicated structure than a test body of the stand-alone high pressure tank, the flame exposure test itself also ends up getting complicated. In other words, from a viewpoint of achieving simplification of a development process of the mounting body or a reduction of costs, the above-described standard is preferably satisfied in the state of the high pressure tank standing alone.

SUMMARY OF THE INVENTION

However, the resin-made liner has a lower thermal conductivity compared to a liner made of a metal such as aluminum, for example. Since this is the case, it is more difficult for heat of a portion exposed to a flame to be promptly conducted to the pressure relief device via the liner in a high pressure tank having a resin-made liner, compared to in a high pressure tank having a metal-made liner.

Moreover, since a permitted distortion of a resin-made liner is higher compared to that of a metal-made liner, a thickness of the reinforced layer covering the resin-made liner is thin. Therefore, there is concern that proportionately to the thickness of the reinforced layer being thin, heat will become more easily transmitted to a portion on an inside of the reinforced layer contributing to maintaining strength of the high pressure tank in a high pressure tank having a resin-made liner, compared to in a high pressure tank having a metal-made liner. In other words, there is concern that thermal degradation of the reinforced layer will more easily advance. As a result, it will become more difficult to satisfy the above-described standard.

A main object of the present invention is to provide a high pressure tank structure that, even though being a high pressure tank structure including a resin-made liner covered with a reinforced layer, can favorably activate a pressure relief device and can suppress thermal degradation of the reinforced layer before activation of the pressure relief device.

According to an embodiment of the present invention, there is provided a high pressure tank structure that includes a high pressure tank configured to store a fluid on an inside of a resin-made liner covered with a reinforced layer, including: a pressure relief device configured to reduce an internal pressure of the high pressure tank when heated to a certain activating temperature; and a heat-resistant plate integrally attached to the high pressure tank, so as to be disposed facing the reinforced layer which is positioned at least on a bottom surface side when mounted in a mounting body.

In this high pressure tank structure, the heat-resistant plate integrally attached to the high pressure tank is disposed as described above. As a result, even when, for example, the high pressure tank structure has been exposed to a flame from at least a portion thereof that will be positioned on the bottom surface side, it can propagate the flame along the heat-resistant plate.

Therefore, even though being a high pressure tank that includes a resin-made liner whose thermal conductivity is lower than that of a liner made of a metal such as aluminum, a local temperature rise of the high pressure tank can be avoided by the heat-resistant plate, without relying on a structure of the mounting body in which the high pressure tank is mounted. As a result, the pressure relief device can be brought to a certain activating temperature to lower the internal pressure of the high pressure tank, that is, the pressure relief device can be favorably activated, before the internal pressure rises to a set value. Moreover, because it can be avoided by the heat-resistant plate that the reinforced layer is directly exposed to the flame or is locally heated, and so on, thermal degradation of the reinforced layer before the pressure relief device is activated can be suppressed. In other words, strength of the high pressure tank can be sufficiently maintained even in the period until the pressure relief device is activated.

Moreover, since the heat-resistant plate is disposed on the bottom surface side of the high pressure tank as described above, then the impact of a foreign body such as a small stone on the high pressure tank can be suppressed when, for example, the high pressure tank structure is mounted in a mounting body such as a vehicle and the vehicle runs. Due to the high pressure tank being able to be protected by the heat-resistant plate in this way, durability of the high pressure tank can be improved.

In the above-described high pressure tank structure, it is preferable that the liner and the reinforced layer include a cylindrical trunk section and dome-like sections that are formed on both sides in an axial direction of the trunk section, and that the heat-resistant plate is attached to the high pressure tank via protective members, each of the protective members covering at least a trunk section side of each of the dome-like sections. In this case, the heat-resistant plate can be easily attached to the high pressure tank by a simple configuration having a small number of components.

In the above-described high pressure tank structure, it is preferable that the heat-resistant plate is attached to the high pressure tank via an installing section, the installing section configured to install the pressure relief device in a pressure relief communicating hole that communicates the inside and an outside of the liner. In this case, heat of the heat-resistant plate whose temperature has risen by being exposed to the flame can be efficiently transmitted to the pressure relief device via the installing section, hence the pressure relief device can be more favorably operated.

In the above-described high pressure tank structure, it is preferable that the heat-resistant plate is attached to the high pressure tank via a partitioning wall section configured to cover at least a part of a cap, the cap including a supplying and discharging hole configured to supply and discharge the fluid to and from the liner. In this case, it is easy for the heat-resistant plate to be attached to the high pressure tank so as to achieve the above-described arrangement, and it becomes possible for the high pressure tank and the heat-resistant plate to be firmly joined by a simple configuration.

In the above-described high pressure tank structure, it is preferable that the heat-resistant plate is disposed in a place exposed to a flame, in a flame exposure test for confirming operation of the pressure relief device. In this case, the flame can be propagated along the heat-resistant plate so it can be avoided that the temperature of the high pressure tank rises locally, at a time of the flame exposure test. As a result, the pressure relief device can be favorably activated to lower the internal pressure of the high pressure tank, before the internal pressure rises to the set value. Moreover, thermal degradation of the reinforced layer before the pressure relief device is activated can be suppressed.

Therefore, regarding the flame exposure test, it becomes possible for the world uniform standard to be satisfied not in a state where the high pressure tank structure has been mounted in the mounting body, but in a state of the high pressure tank structure standing alone. In this case, it can be made unnecessary to perform the flame exposure test for each specification or model of the mounting body in which a common high pressure tank is to be mounted. Moreover, there can also be made unnecessary a complicated flame exposure test that uses a complicated test body simulating the state where the high pressure tank has been mounted in the mounting body. As a result, it becomes possible to achieve simplification of a development process of the mounting body or a reduction of costs.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Figure 1:
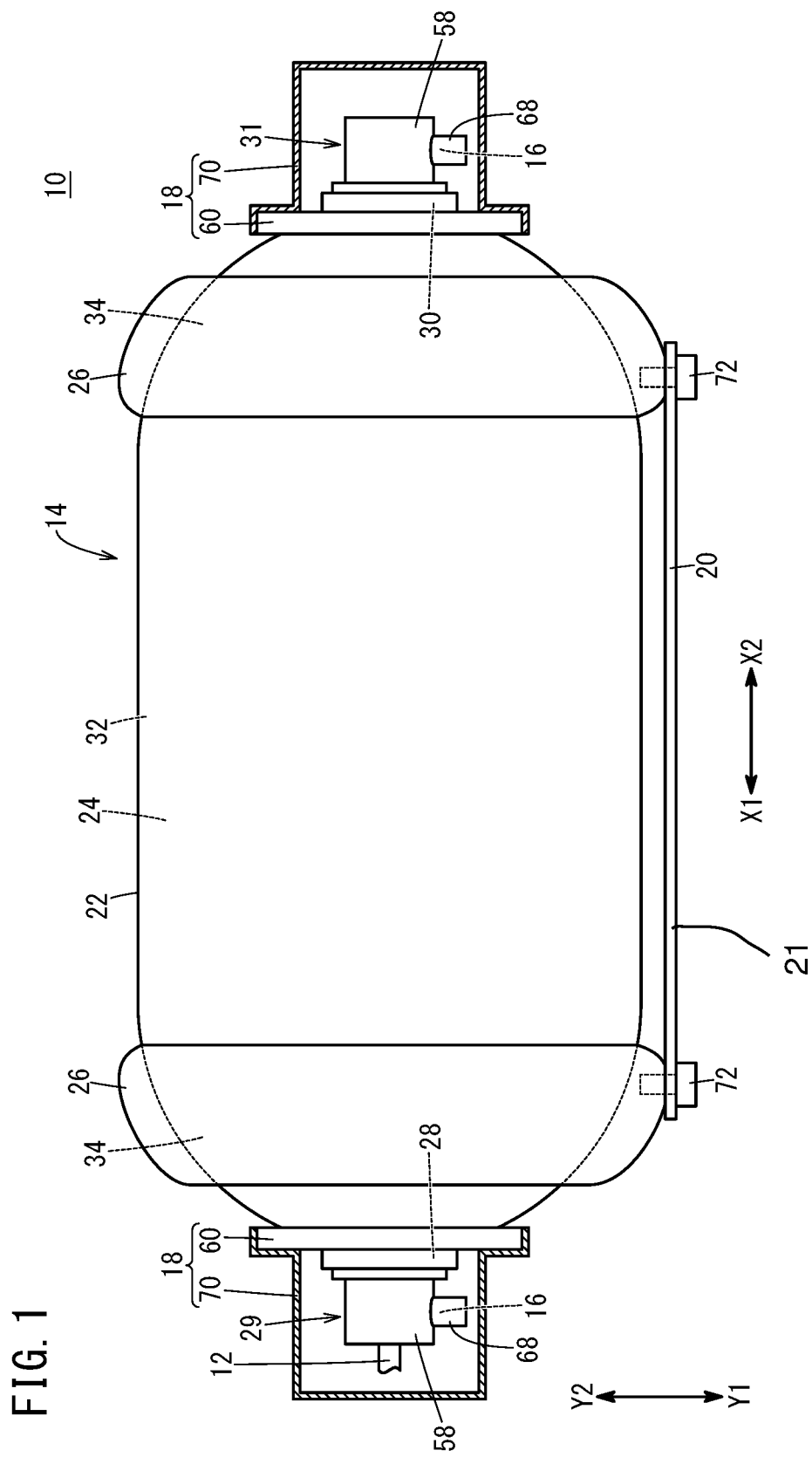
FIG. 1 is a schematic configuration diagram of a high pressure tank structure according to a first embodiment of the present invention.

Preferred embodiments of a high pressure tank structure according to the present invention will be presented and described in detail with reference to the accompanying drawings. Note that in the drawings below, configuring elements displaying the same or similar functions and advantages will be assigned with the same reference symbols, and repeated descriptions thereof will sometimes be omitted.

The high pressure tank structure according to the present invention can be preferably employed as a high pressure tank structure that is mounted in a mounting body being a fuel cell vehicle, for example, and stores a hydrogen gas for supplying to a fuel cell system. Accordingly, although the present embodiment describes an example where the mounting body is assumed to be a fuel cell vehicle and the high pressure tank stores the hydrogen gas as a fluid, the present embodiment is not particularly limited to this. The high pressure tank structure may be mounted in a mounting body other than a fuel cell vehicle, and it is also possible for a fluid other than hydrogen gas to be stored in the high pressure tank.

As shown in FIG. 1, a high pressure tank structure 10 according to the present embodiment mainly includes: a high pressure tank 14 that is supplied with/discharges a hydrogen gas via a supplying/discharging pipe 12; a pressure relief device (TPRD) 16; a partitioning wall section 18; and a heat-resistant plate 20.

Figure 2:
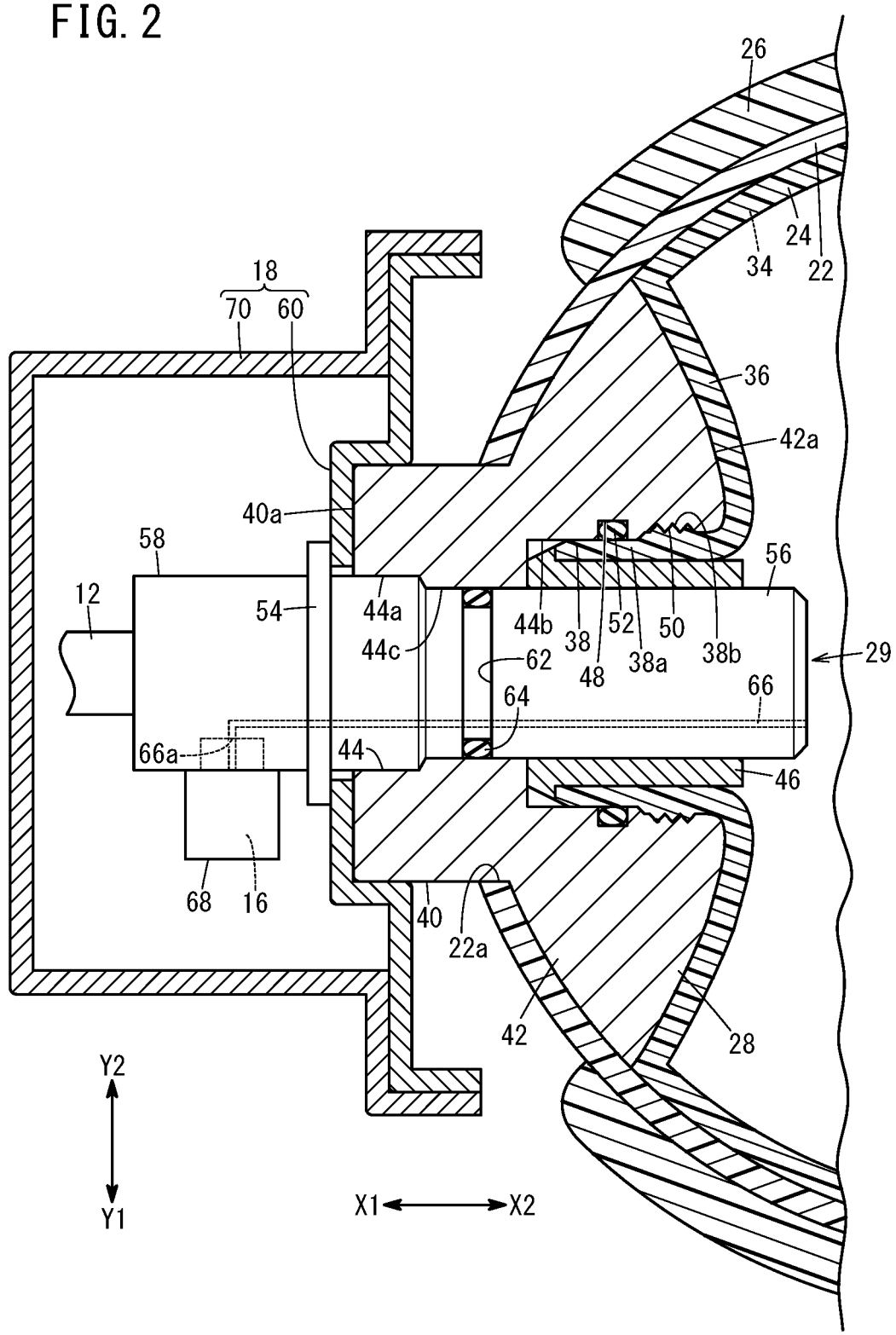
FIG. 2 is an enlarged cross-sectional view of a part of FIG. 1.

As shown in FIGS. 1 and 2, the high pressure tank 14 includes a reinforced layer 22, a liner 24, a protective member 26, a supplying/discharging-side cap 28, a supplying/discharging-side inserting member 29, an end-side cap 30, and an end-side inserting member 31. Note that the high pressure tank 14 has the supplying/discharging-side cap 28 provided on a one end side (a side of arrow X1 in FIG. 1) in its axial direction (hereafter, also simply called an axial direction), and has the end-side cap 30 provided on another end side (a side of arrow X2 in FIG. 1) in the axial direction.

The high pressure tank structure 10 according to the present embodiment is configured mounted in the mounting body (not illustrated), such that a direction orthogonal to the axial direction of the high pressure tank 14 (a direction of arrows Y1, Y2 in FIG. 1) lies along a perpendicular direction. Hereafter, of the high pressure tank structure 10 mounted in the mounting body as described above, an arrow Y1 side in FIG. 1 will be assumed to be a bottom surface side and an arrow Y2 side in FIG. 1 will be assumed to be an upper surface side.

The reinforced layer 22 is configured from a carbon fiber reinforced plastic (CFRP) or the like, and covers an outer surface of the liner 24, and so on. The liner 24 is a hollow body configured from a resin, and is capable of storing the hydrogen gas on its inside. Specifically, the liner 24 includes: a cylindrical trunk section 32 (refer to FIG. 1); a dome-like section 34 provided on both sides in the axial direction of the trunk section 32; a sunken section 36 (refer to FIG. 2) provided on both sides in the axial direction of the dome-like section 34; and a cylindrical section 38 (refer to FIG. 2) that projects from the sunken section 36 and has a smaller diameter than the trunk section 32.

Note that in the present embodiment, the reinforced layer 22 and the liner 24 have their one end side and their other end side in the axial direction configured substantially similarly. Hereafter, configurations on the one end side of the reinforced layer 22 and the liner 24 will be described as an example.

As shown in FIG. 2, the sunken section 36 sinks toward the inside storing the hydrogen gas of the liner 24. The cylindrical section 38 has a thin section 38a provided on its projecting end side (a side of arrow X1 in FIG. 2), and has a male thread 38b provided more to its base end side (a side of arrow X2 in FIG. 2) than the thin section 38a.

The protective member 26 is configured from a resin or the like, for example, and covers, via the reinforced layer 22, mainly a boundary portion of the dome-like section 34 and trunk section 32 of the liner 24 and a periphery of the boundary portion. By the protective member 26 being thus provided, impact resistance, and so on, of the high pressure tank 14 can be improved.

As shown in FIG. 2, the supplying/discharging-side cap 28 is made of a metal, for example, and surrounds the cylindrical section 38 of the liner 24. Moreover, the supplying/discharging-side cap 28 includes a cylindrical projection 40 and a shoulder section 42 that extends outwardly in a radial direction from a base end of the projection 40, and there is a supplying/discharging (supplying and discharging) hole 44 formed penetrating along an axial direction of the projection 40. An end surface 42a on an opposite side (the side of arrow X2 in FIG. 2) to the projection 40, of the shoulder section 42 faces an outer surface of the sunken section 36 of the liner 24. Moreover, an outer peripheral surface of the shoulder section 42, along with the trunk section 32 and dome-like section 34 of the liner 24, is covered with the reinforced layer 22. The projection 40 projects so as to be exposed from an opening 22a provided in the reinforced layer 22.

The supplying/discharging hole 44 is configured from the following whose diameters differ according to region, namely: a medium inner diameter hole 44a positioned on a tip surface 40a side of the projection 40; a large inner diameter hole 44b positioned on an end surface 42a side of the shoulder section 42; and a small inner diameter hole 44c positioned between these medium inner diameter hole 44a and large inner diameter hole 44b. The cylindrical section 38 of the liner 24 is inserted in the large inner diameter hole 44b, and a cylindrical collar 46 is press-fitted into the cylindrical section 38. As a result, the cylindrical section 38 is supported between an inner circumferential surface of the large inner diameter hole 44b and an outer circumferential surface of the collar 46.

An annular first seal groove 48 that follows a circumferential direction is formed in an inner wall of the large inner diameter hole 44b in a region facing the thin section 38a of the cylindrical section 38, and a female thread 50 that is threaded with the male thread 38b of the cylindrical section 38 is formed in the inner wall of the large inner diameter hole 44b in a region facing the male thread 38b. A first seal member 52 configured from an O ring is arranged on an inside of the first seal groove 48, whereby a seal is made between the outer circumferential surface of the cylindrical section 38 and the inner circumferential surface of the large inner diameter hole 44b. Moreover, by the male thread 38b and the female thread 50 being threaded with each other, the cylindrical section 38 of the liner 24 and the supplying/discharging-side cap 28 are joined.

The supplying/discharging hole 44 of the supplying/discharging-side cap 28 is provided with the supplying/discharging-side inserting member 29. The end-side cap 30 is configured similarly to the supplying/discharging-side cap 28, apart from having its supplying/discharging hole 44 provided with the end-side inserting member 31.

The supplying/discharging-side inserting member 29 includes: a flange section 54 having a diameter which is larger than that of an opening on the medium inner diameter hole 44a side of the supplying/discharging hole 44; an inserting section 56 that extends from the flange section 54 toward an inside of the supplying/discharging hole 44; and a connecting section 58 that extends from the flange section 54 toward an outside of the supplying/discharging hole 44. In the supplying/discharging-side inserting member 29, the inserting section 56 is inserted in the supplying/discharging hole 44 along circumferential surfaces of the medium inner diameter hole 44a and small inner diameter hole 44c and an inner circumferential surface of the collar 46, whereby the flange section 54 faces the tip surface 40a of the projection 40. As will be mentioned later, a supporting plate 60 of the partitioning wall section 18 is sandwiched between this flange section 54 and the tip surface 40a of the projection 40.

An outer circumferential surface of a portion facing the small inner diameter hole 44c in the supplying/discharging hole 44, of the inserting section 56 has formed therein an annular second seal groove 62 that follows the circumferential direction, and there is arranged on an inside of the second seal groove 62 a second seal member 64 configured from an O ring. As a result, a seal is made between an outer circumferential surface of the inserting section 56 and an inner circumferential surface of the supplying/discharging hole 44.

The supplying/discharging pipe 12 is connected to the connecting section 58. An inside of the supplying/discharging-side inserting member 29 is provided with the following, neither of which is illustrated, namely: a flow path that communicates the supplying/discharging pipe 12 and the inside of the liner 24; and a main stop valve (an electromagnetic valve) that opens/closes the flow path. Moreover, a pressure relief communicating hole 66 is formed in the supplying/discharging-side inserting member 29 and communicates the inside and an outside of the liner 24, and the pressure relief device 16 is provided so as to close an opening 66a on a side facing the outside of the liner 24 of the pressure relief communicating hole 66. The pressure relief device 16 is installed in the connecting section 58 via an installing section 68. The installing section 68 is configured to be fixable to the connecting section 58 by, for example, threading of a male thread provided in the installing section 68 and a female thread provided in the connecting section 58.

The end-side inserting member 31 is configured similarly to the supplying/discharging-side inserting member 29, apart from not including on its inside a flow path communicating the supplying/discharging pipe 12 and the inside of the liner 24 and a main stop valve (an electromagnetic valve) that opens/closes the flow path, and apart from the supplying/discharging pipe 12 not being connected to its connecting section 58.

When the pressure relief device 16 is at a certain activating temperature or less, it maintains a state of closing the opening 66a of the pressure relief communicating hole 66. On the other hand, when the pressure relief device 16 has reached the activating temperature, it opens the opening 66a of the pressure relief communicating hole 66 to communicate the inside and the outside of the liner 24, and thereby reduces an internal pressure of the high pressure tank 14. Note that the activating temperature of the pressure relief device 16 is preset so that the pressure relief device 16 is never mistakenly activated by a temperature rise during normal operation of the high pressure tank structure 10 such as during filling of the fluid to the liner 24, and is promptly activated by a temperature rise during an abnormality such as a fire. A well-known pressure relief device like that described in, for example, the specification of U.S. Pat. No. 5,848,604, and so on, may be adopted as this kind of pressure relief device 16, hence a description of its detailed configuration will be omitted.

The partitioning wall section 18 includes the supporting plate 60 and a duct cover 70. As described above, the supporting plate 60 is sandwiched between the flange section 54 of the supplying/discharging-side inserting member 29 and the projection 40 of the supplying/discharging-side cap 28, and is thereby attached to the high pressure tank 14 so as to cover a tip side of the projection 40 of the supplying/discharging-side cap 28. By the duct cover 70 being attached to this supporting plate 60, a space is formed between the supporting plate 60 and the duct cover 70. This space houses the connecting section 58 of the supplying/discharging-side inserting member 29, the pressure relief device 16, a part of the supplying/discharging pipe 12, and so on.

As shown in FIG. 1, in the first embodiment, the heat-resistant plate 20 is in the form of a plate configured from a heat-resistant metal such as iron or a fireproof fabric, for example, and is integrally attached to the high pressure tank 14 via the protective member 26. The heat-resistant plate comprises a base portion 21 which is attached to, and disposed facing the reinforced layer 22 on the bottom surface side. In other words, the heat-resistant plate 20 is fixed to the protective member 26. Although a method of fixing the protective member 26 and the heat-resistant plate 20 is not particularly limited, the four corners of the heat-resistant plate 20 may be screw-fastened to the protective member 26 using bolts 72 or the like (refer to FIG. 1), for example.

As will be mentioned later, from a viewpoint of suppressing heat conduction to the reinforced layer 22 occurring from the heat-resistant plate 20 when the heat-resistant plate 20 is exposed to a flame, and so on, the heat-resistant plate 20 and the reinforced layer 22 are preferably made to face each other separated by 10 mm or more. Dimensions of the heat-resistant plate 20 are preferably set such that a length of one side thereof will be longer than a distance between protective members 26 on both end sides in the axial direction of the high pressure tank 14, and a length of another side thereof will be longer than a length of the high pressure tank 14 in the radial direction.

The high pressure tank structure 10 according to the first embodiment is basically configured as above. In this high pressure tank structure 10, the hydrogen gas that has been supplied to the supplying/discharging pipe 12 from a hydrogen supply source (not illustrated), for example, is supplied to the inside of the high pressure tank 14 (the liner 24) via the main stop valve in an open state. When the high pressure tank 14 has been sufficiently filled with the hydrogen gas by this gas supply, supply of hydrogen from the hydrogen supply source is stopped. When the hydrogen gas inside the high pressure tank 14 is supplied to the fuel cell system, the hydrogen gas is discharged to the supplying/discharging pipe 12 via the main stop valve set to the open state.

By the hydrogen gas being supplied as described above, the inside of the high pressure tank 14 attains a high pressure state. The internal pressure of this high pressure tank 14 is managed so as to never exceed a predetermined set value. However, when, for example, the high pressure tank 14 has been placed under a high temperature environment due to a fire, or the like, it becomes easy for the internal pressure of the high pressure tank 14 to rise more than at a normal time due to thermal expansion of the hydrogen gas, and so on. In order to avoid the internal pressure of the high pressure tank 14 exceeding the set value even under such a high temperature environment, the high pressure tank structure 10 is provided with the pressure relief device 16 operating as described above.

Figure 3:
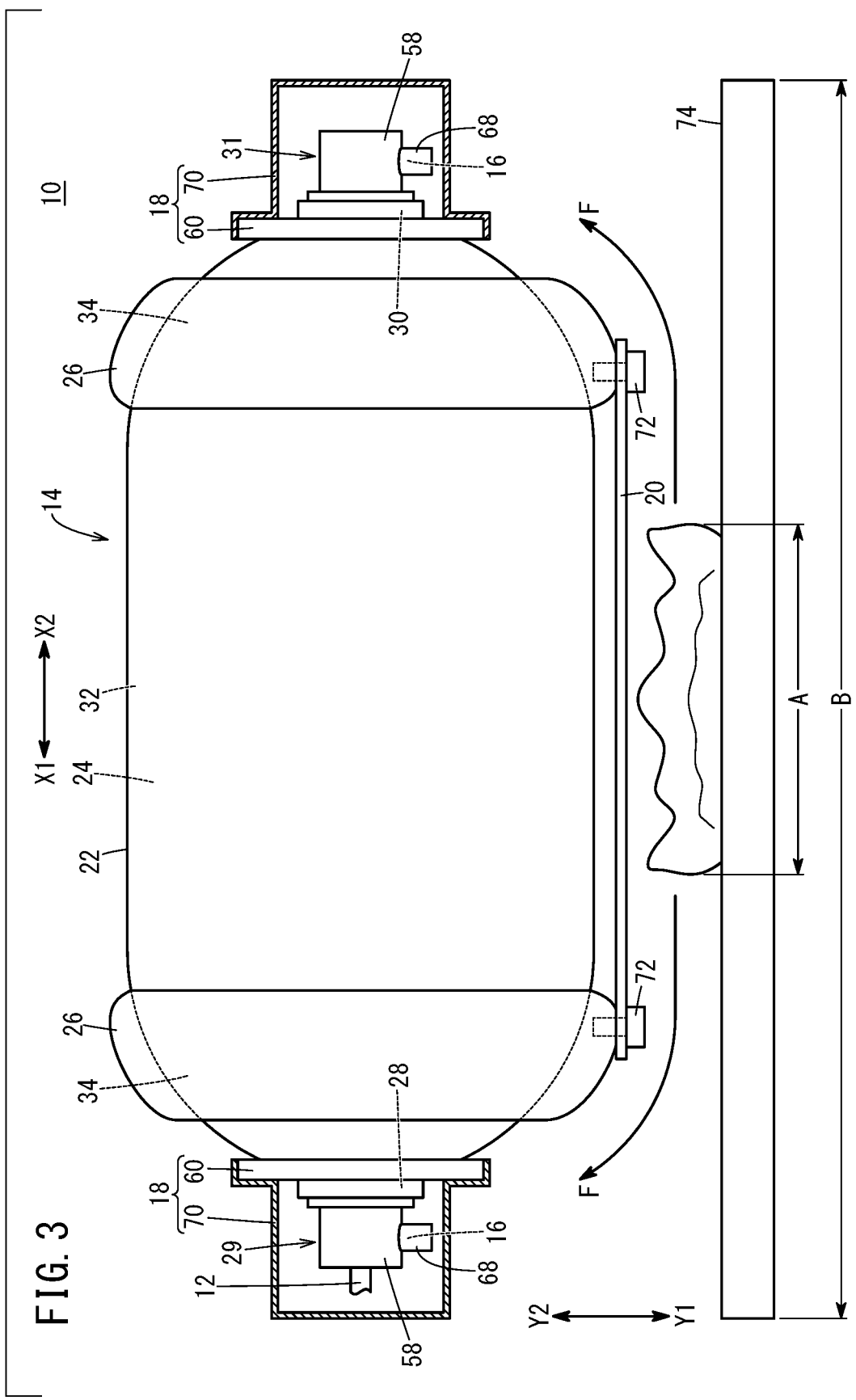
FIG. 3 is an explanatory diagram for explaining a flame exposure test on the high pressure tank structure of FIG. 1.

In the high pressure tank structure 10, by performing a flame exposure test as one of items of a world uniform standard, it can be confirmed whether or not the high pressure tank structure 10 has a flame resistance required for it to be employed mounted in the mounting body. As shown in FIG. 3, in the flame exposure test, first, a portion most separated from the pressure relief device 16 (a local flame-exposure range A) on the bottom surface side when the high pressure tank structure 10 has been mounted in the mounting body, is exposed to a flame using a combustion apparatus 74, or the like. Then, after a certain time has elapsed, an entire range (an entire flame-exposure range B) on the above-described bottom surface side is exposed to a flame. As described above, in the high pressure tank structure 10 according to the present embodiment, the pressure relief device 16 is provided on both end sides in the axial direction of the high pressure tank 14, hence a portion in substantially the center in the axial direction of the heat-resistant plate 20 will be the local flame-exposure range A.

In order to satisfy the standard of this flame exposure test, it is required that before the internal pressure of the high pressure tank 14 that is rising by being exposed to a flame as described above reaches the set value, the pressure relief device 16 reach the activating temperature and thereby operate in order to lower the internal pressure. Moreover, it is required that in a period until the pressure relief device 16 is activated, thermal degradation of the reinforced layer 22 be avoided so as to enable strength of the high pressure tank 14 to be sufficiently maintained. In other words, in order to satisfy the above-described standard, there should be avoided a situation such as where a temperature of the portion exposed to the flame of the high pressure tank 14 locally rises.

In this high pressure tank structure 10, as described above, in the flame exposure test, first, substantially the center in the axial direction of the heat-resistant plate 20 (the local flame-exposure range A) is exposed to the flame, so the flame can be propagated along the heat-resistant plate 20 to both sides in the axial direction of the heat-resistant plate 20. This makes it easy for heat of the flame to be transmitted to the pressure relief device 16 along a direction shown by arrow F in FIG. 3, and allows it to be avoided that a central section in the axial direction of the reinforced layer 22 or the liner 24 is locally heated.

As a result, even in the high pressure tank 14 that includes the resin-made liner 24 whose thermal conductivity is lower than that of a liner (not illustrated) made of a metal such as aluminum, the pressure relief device 16 can be brought to the activating temperature to lower the internal pressure of the high pressure tank 14, before the internal pressure rises to the set value. That is, the pressure relief device 16 can be favorably activated.

Moreover, due to a permitted distortion of the resin-made liner 24 of the high pressure tank 14 being higher compared to that of a metal-made liner, a thickness of the reinforced layer 22 of the high pressure tank 14 is thinner compared to that of a high pressure tank (not illustrated) having a metal-made liner. There is concern that if the thickness of the reinforced layer 22 becomes thin, then it will become easy for heat to be transmitted to a portion on an inside of the reinforced layer 22 contributing to maintaining strength of the high pressure tank 14, and it will become easy for thermal degradation of the reinforced layer 22 to advance. Even in such a case, because it can be avoided by the heat-resistant plate 20 that the reinforced layer 22 is directly exposed to the flame or is locally heated, thermal degradation of the reinforced layer 22 can be suppressed before the pressure relief device 16 is activated. In other words, strength of the high pressure tank 14 can be sufficiently maintained even in the period until the pressure relief device 16 is activated.

As shown above, in the high pressure tank structure 10, the above-described standard can be satisfied in a state of the high pressure tank structure 10 standing alone, without providing the mounting body with a configuration for suppressing local heat input to the reinforced layer 22, and so on.

Therefore, contrary to the case where setting has been made so as to satisfy the above-described standard in a state where the high pressure tank 14 has been mounted in the mounting body, it can be made unnecessary to perform the flame exposure test for each specification or model of the mounting body in which a common high pressure tank 14 is to be mounted. Moreover, there can also be made unnecessary a complicated flame exposure test that uses a complicated test body simulating the state where the high pressure tank 14 has been mounted in the mounting body. As a result, it becomes possible to achieve simplification of a development process of the mounting body or a reduction of costs.

Moreover, in the high pressure tank structure 10, since the heat-resistant plate 20 is disposed on the bottom surface side of the high pressure tank 14 as described above, then the impact of a foreign body (such as a small stone) on the high pressure tank 14 can be suppressed in such cases as when, for example, the high pressure tank structure 10 is mounted in a mounting body and the mounting body runs. Since the high pressure tank 14 can be protected by the heat-resistant plate 20 in this way, durability of the high pressure tank 14 can be improved.

Moreover, in the high pressure tank structure 10 according to the first embodiment, the heat-resistant plate 20 is fixed to the protective member 26, and thus the heat-resistant plate 20 can be easily attached to the high pressure tank 14 by a simple configuration having a small number of components.

Figure 4:
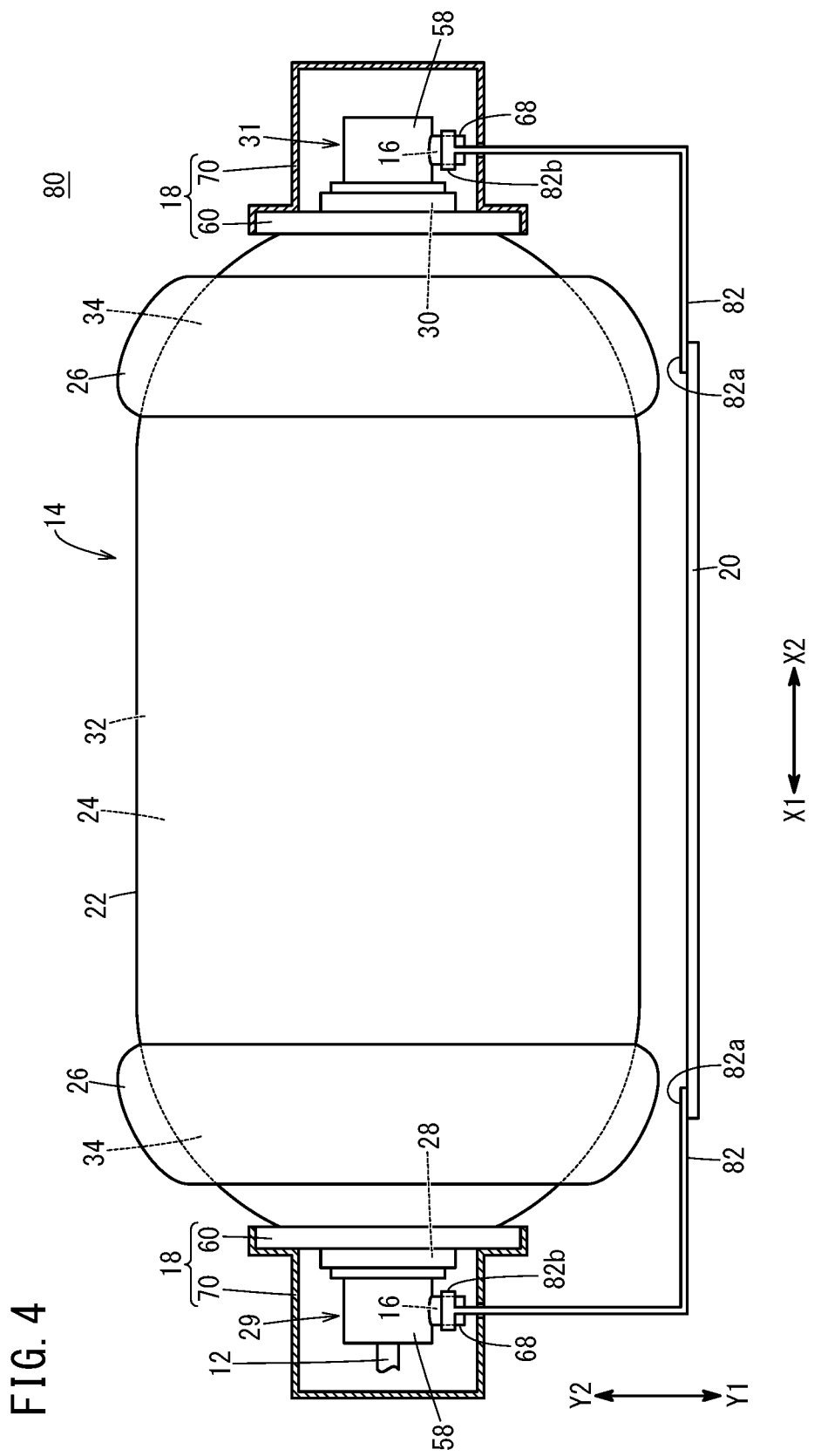
FIG. 4 is a schematic configuration diagram of a high pressure tank structure according to a second embodiment of the present invention.

Next, a high pressure tank structure 80 according to a second embodiment will be described with reference to FIG. 4. The high pressure tank structure 80 is configured similarly to the high pressure tank structure 10 according to the first embodiment, apart from the heat-resistant plate 20 being integrally attached to the high pressure tank 14 via the installing sections 68.

Specifically, the heat-resistant plate 20 is attached to the high pressure tank 14 so as to be disposed as described above, by each of attaching members 82 whose one end section 82*a* is fixed to the heat-resistant plate 20 and whose other end section 82*b* is fixed to the installing section 68. Although methods of fixing of each of the heat-resistant plate 20 and installing section 68 and the attaching member 82 are not particularly limited, for example, the one end section 82*a* of the attaching member 82 and the heat-resistant plate 20 may be fixed by screw-fastening, or the like. Moreover, the other end section 82*b* of the attaching member 82 and the installing section 68 may be fixed by fitting the other end section 82*b* and the installing section 68 to each other.

In the high pressure tank structure 80 according to the second embodiment configured as described above, heat of the heat-resistant plate 20 whose temperature has risen by being exposed to a flame can be efficiently transmitted to the pressure relief device 16 via the attaching members 82 and the installing sections 68. Therefore, the pressure relief device 16 can be more favorably operated.

Next, a high pressure tank structure 90 according to a third embodiment will be described with reference to FIG. 5. The high pressure tank structure 90 is configured similarly to the high pressure tank structure 10 according to the first embodiment, apart from the heat-resistant plate 20 being integrally attached to the high pressure tank 14 via the partitioning wall sections 18.

Specifically, the heat-resistant plate 20 is attached to the high pressure tank 14 so as to be disposed as described above, by each of attaching members 92 whose one end section 92*a* is fixed to the heat-resistant plate 20 and whose other end section 92b is fixed to the partitioning wall section 18. Although methods of fixing of each of the heat-resistant plate 20 and partitioning wall section 18 and the attaching member 92 are not particularly limited, for example, the one end section 92a of the attaching member 92 and the heat-resistant plate 20 may be fixed by screw-fastening, or the like. Moreover, when the partitioning wall section 18 is configured from a resin, the other end section 92b of the attaching member 92 and the partitioning wall section 18 may be integrated by insert molding, or the like.

Figure 5:
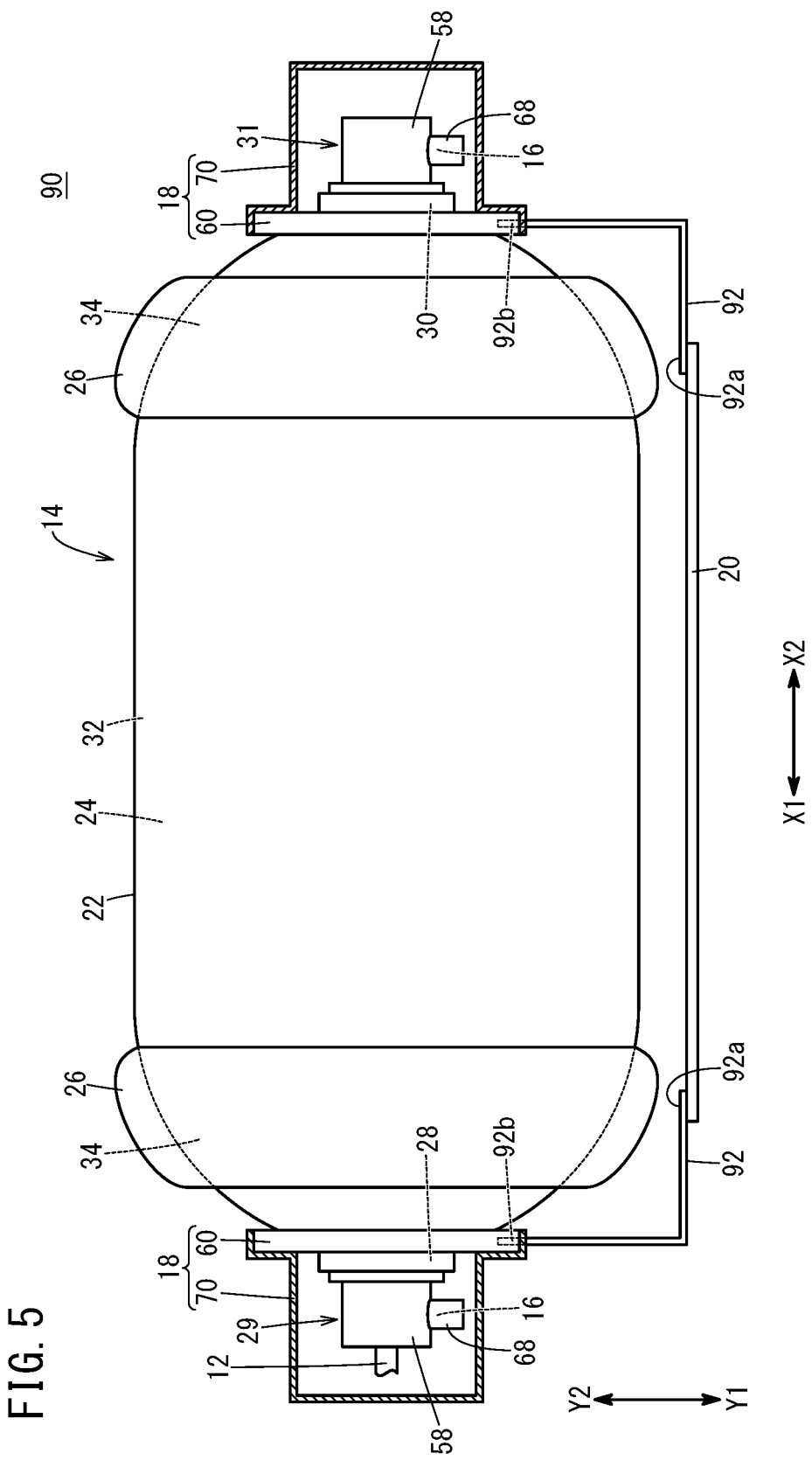
FIG. 5 is a schematic configuration diagram of a high pressure tank structure according to a third embodiment of the present invention.

Note that although in the exemplification of FIG. 5, the other end section 92b of the attaching member 92 has been configured fixed to the supporting plate 60, the present embodiment is not particularly limited to this, and the other end section 92b of the attaching member 92 may be fixed to any place of the partitioning wall section 18.

In the high pressure tank structure 90 according to the third embodiment configured as described above, it is easy for the heat-resistant plate 20 to be attached to the high pressure tank 14 so as to achieve the above-described arrangement, and it becomes possible for the high pressure tank 14 and the heat-resistant plate 20 to be firmly joined by a simple configuration.

The present invention is not particularly limited to the above-described embodiments, and may be variously modified in a range not departing from the spirit of the present invention.

Although in the above-described high pressure tank structures 10, 80, 90 according to the first through third embodiments, the high pressure tank 14 has been configured to include the end-side cap 30, the high pressure tank 14 need not include the end-side cap 30. In this case, the pressure relief device 16 is provided only for the supplying/discharging-side inserting member 29 inserted in the supplying/discharging hole 44 of the supplying/discharging-side cap 28. Therefore, in the flame exposure test, a portion on the other end side in the axial direction of the heat-resistant plate 20 will first be exposed to the flame. Even in this case, it can be avoided that the temperature of the high pressure tank 14 locally rises, hence operational advantages similar to those described above can be obtained.

In the above-described high pressure tank structures 10, 80 according to the first and second embodiments, the partitioning wall section 18 is not an indispensable configuring element, and the partitioning wall section 18 need not be included.

What is claimed is:

1. A high pressure tank structure comprising:
a high pressure tank configured to store a fluid on an inside of a resin-made liner covered with a reinforced layer, said tank having a cylindrical trunk section and two dome-like sections that are respectively formed on opposite sides of the trunk section in an axial direction;
a pair of pressure relief devices configured to reduce an internal pressure of the high pressure tank when heated to a certain activating temperature, with a respective one of said pressure relief devices disposed on each of the dome-like sections; and
a heat-resistant plate integrally attached to the high pressure tank and disposed facing the reinforced layer, the heat-resistant plate comprising a base portion which is configured to be positioned on a bottom surface side of the tank when mounted in a mounting body;
wherein the heat-resistant plate is attached to the tank in at least two places.

2. The high pressure tank structure according to claim 1, wherein the heat-resistant plate is attached to the high pressure tank via protective members, each of the protective members covering at least a trunk section side of a respective one of the dome-like sections.

3. The high pressure tank structure according to claim 1, wherein the heat-resistant plate is attached to the high pressure tank via an installing section, the installing section configured to install the pressure relief device in a pressure relief communicating hole that communicates between the inside and an outside of the liner.

4. The high pressure tank structure according to claim 1, wherein the heat-resistant plate is attached to the high pressure tank via a partitioning wall section configured to cover at least a part of a cap, the cap including a supplying and discharging hole configured to supply and discharge the fluid to and from the liner.

5. The high pressure tank structure according to claim 1, wherein the heat-resistant plate is disposed in a place configured to be exposed to a flame, in a flame exposure test for confirming operation of the pressure relief device.

6. A high pressure tank structure that includes a high pressure tank configured to store a fluid on an inside of a resin-made liner covered with a reinforced layer, said high pressure tank structure comprising:
a pressure relief device configured to reduce an internal pressure of the high pressure tank when heated to a certain activating temperature; and
a heat-resistant plate integrally attached to the high pressure tank and disposed facing the reinforced layer, the reinforced layer comprising a base portion which is configured to be positioned on a bottom surface side when mounted in a mounting body;
wherein the liner and the reinforced layer include a cylindrical trunk section and dome-like sections that are respectively formed on opposite sides of the trunk section in an axial direction, and
the heat-resistant plate is attached to the high pressure tank via protective members, each of the protective members covering at least a trunk section side of a respective one of the dome-like sections.

7. A high pressure tank structure that includes a high pressure tank configured to store a fluid on an inside of a resin-made liner covered with a reinforced layer, said high pressure tank structure comprising:
a pressure relief device configured to reduce an internal pressure of the high pressure tank when heated to a certain activating temperature; and
a heat-resistant plate integrally attached to the high pressure tank and disposed facing the reinforced layer, the reinforced layer comprising a base portion which is configured to be positioned on a bottom surface side when mounted in a mounting body;
wherein the heat-resistant plate is attached to the high pressure tank via a partitioning wall section configured to cover at least a part of a cap, the cap including a supplying and discharging hole configured to supply and discharge the fluid to and from the liner.

* * * * *